UNITED STATES PATENT OFFICE.

GUSTAV HERMANN NEUHAUSS, JOHANN FRANZ HUGO GRONWALD, AND EMIL HEINRICH CONRAD OEHLMANN, OF BERLIN, GERMANY.

METHOD OF PREPARING STERILIZED CHOCOLATE.

SPECIFICATION forming part of Letters Patent No. 456,589, dated July 28, 1891.

Application filed November 6, 1890. Serial No. 370,515. (No specimens.)

*To all whom it may concern:*

Be it known that we, GUSTAV HERMANN NEUHAUSS, agriculturist, JOHANN FRANZ HUGO GRONWALD, apothecary, and EMIL HEINRICH CONRAD OEHLMANN, engineer, subjects of the Emperor of Germany, residing at the city of Berlin, in said Empire, have invented certain new and useful Improvements in the Manufacture of Liquid Chocolate and other Liquids, of which we declare the following to be a full, clear, and exact description.

In the sterilizing processes until now in use the liquid to be sterilized was heated in open or closed vessels for a long time. In the first case the liquid is sterilized. It does not, however, keep perfectly, and only in the second case a perfectly-keeping sterilized liquid is obtained, provided the vessels containing the sterilized liquid are closed against the admission of air. For practical use this usual sterilizing process has the disadvantage that the liquid must be exposed for a long time to a temperature above 100° before a keeping liquid free from germs is obtained. To avoid this inconvenience is the object of the present invention, and our process is distinguished by the fact that the liquid to be sterilized being first under pressure is heated to over 100° and then brought to boil for a short time through lessening of this pressure. With the new sterilizing method the consumption of steam is not only very much smaller, but the time in which a safe and lasting sterilization is effected is much shorter.

In the following specification this new method will be described in its use for the manufacture of sterilized liquid chocolate.

Cocoa-powder from which the oil has been pressed, such as is in the market, is stirred and boiled with pure milk or milk mixed with water. This mixture is cooled off quickly, so that the butter of cocoa made liquid during the warming and which has not been taken up by the mixture—*i. e.*, absorbed—parts out in solid form, when it can be taken off with ease. The taking off of the cocoa-butter is advantageous, as otherwise after the cooling off of the liquid small pieces rise to the surface and give the beverage an uncomely appearance. The liquid, freed as much as possible from the cocoa-butter and having added thereto any desired flavoring material, is treated for sterilization in the following manner: The mixture thus obtained—we will call it "chocolate" hereinafter—is heated before the sterilization proper and is then cooled off. After the cooling the sterilizing proper is begun by means of stagnating steam—*i. e.*, steam forced, under pressure, into a closed vessel also containing the chocolate—with the exclusion of all atmospheric air, and toward the end of the sterilization a short boiling is occasioned. This boiling is necessary to obtain a perfect sterilization and keeping, because heating to a high temperature, unless continued for a long time, without causing the boiling process, does not offer perfect safety. Only a heating of long duration at a high temperature would cause a safe sterilization, which would essentially prolong and make the process dearer. This necessary boiling of the chocolate is made in the following manner: After the chocolate has taken the temperature of the steam the tension of steam is lessened in the surrounding chamber by blowing off. Through more or less of the steam escaping from the expansion-chamber a more or less strong boiling is occasioned. After the boiling has taken place the vessels containing the safely-sterilized chocolate are closed, with exclusion of all atmospheric air. In the same way milk or any other liquid can be sterilized by steam at a pressure of over 100° by causing a boiling which had been previously suppressed by pressure.

We claim—

1. The herein-described process of making sterilized liquid chocolate, which consists in boiling the chocolate in milk, then cooling the liquid thus formed and removing the cocoa-butter, and then sterilizing by heating the liquid to a temperature over 100° while under pressure and subsequently causing it to boil by reducing the pressure, substantially as set forth.

2. The herein-described method of sterilizing liquid chocolate and the like, which consists in, first, heating the chocolate; second, rapidly cooling the chocolate and removing the particles of cocoa-butter formed by said rapid cooling; third, heating said chocolate by steam under pressure and permitting it to boil by the brief reduction of the pressure, and, finally, depositing it in vessels from which air is excluded and sealing or otherwise closing the vessels air-tight.

In witness whereof we have hereunto set our hands in presence of two witnesses.

GUSTAV HERMANN NEUHAUSS.
JOHANN FRANZ HUGO GRONWALD.
EMIL HEINRICH CONRAD OEHLMANN.

Witnesses:
GOTTFRIED NIEMÖLLER,
BRUNO EBERTH.